(12) United States Patent
Gallagher et al.

(10) Patent No.: US 6,580,835 B1
(45) Date of Patent: Jun. 17, 2003

(54) METHOD FOR ENHANCING THE EDGE CONTRAST OF A DIGITAL IMAGE

(75) Inventors: Andrew C. Gallagher, Rochester, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/324,239

(22) Filed: Jun. 2, 1999

(51) Int. Cl.$^7$ .................................................. G06K 9/40
(52) U.S. Cl. ...................................... 382/274; 358/475
(58) Field of Search .............................. 382/270–275; 358/1.9, 475

(56) References Cited

U.S. PATENT DOCUMENTS

| | | | |
|---|---|---|---|
| 4,636,845 A | * 1/1987 | Alkofer | 236/46 R |
| 4,642,684 A | * 2/1987 | Alkofer | 355/38 |
| 4,677,465 A | 6/1987 | Alkofer | 358/80 |
| 5,271,064 A | 12/1993 | Dhawan et al. | 382/54 |
| 5,524,070 A | 6/1996 | Shin et al. | 382/274 |
| 6,072,605 A | * 6/2000 | Gilman et al. | 358/527 |
| 6,167,165 A | * 12/2000 | Gallagher et al. | 382/263 |

OTHER PUBLICATIONS

"Digital Image Processing" by William Pratt, Second Edition, John Wiley & Sons, 1991, pp. 278–284.

* cited by examiner

Primary Examiner—Thomas D. Lee
Assistant Examiner—Stephen Brinich
(74) Attorney, Agent, or Firm—David M. Woods

(57) ABSTRACT

A method for utilizing a predetermined tone scale conversion to enhance a digital image comprised of a plurality of image pixels, each image pixel characterized by an image value, includes the steps of providing image pixels corresponding to a region of the image; identifying a statistical characteristic of the image pixels in the region; normalizing the predetermined tone scale conversion for the statistical characteristic in order to generate a normalized tone scale conversion; and performing the normalized tone scale conversion on a central pixel of the region in order to generate an enhanced output pixel. In one embodiment, a scaling function is generated based upon the statistical parameter and a first intermediate value is generated from application of the scaling function to the input pixel value. Then a second intermediate value is generated from the application of the first intermediate value to the tone scale function, and an enhanced pixel value is then obtained from application of the inverse of the scaling function to the second intermediate value.

26 Claims, 7 Drawing Sheets

METHOD FOR ENHANCING THE EDGE CONTRAST OF A DIGITAL IMAGE

FIELD OF THE INVENTION

The invention relates generally to the field of digital image processing and, more particularly, to a method for enhancing the edge contrast of a digital image.

BACKGROUND OF THE INVENTION

Traditional methods of increasing the apparent sharpness of a digital image, such as the technique of unsharp masking, often produce unwanted artifacts at large transition edges in the image. For example, unsharp masking is often described by the equation:

$$S_{proc} = S_{org} + B(S_{org} - S_{us})$$

where Sproc represents the processed image signal in which the high frequency components have been amplified, Sorg represents the original image signal, Sus represents the unsharp image signal, typically a smoothed image signal obtained by filtering the original image, and B represents the high frequency emphasis coefficient.

The unsharp masking operation may be modeled as a linear system. Thus, the magnitude of any frequency in Sproc is directly dependent upon the magnitude of that frequency in the Sorg image signal. As a consequence of this superposition principle, large edges in the Sorg image signal will often display a ringing artifact in the Sproc signal when the desired level of high frequency enhancement has been performed in other areas of the Sproc signal. This ringing artifact appears as a light or dark outline around the large edge, and may be visually objectionable.

Many non-linear filters based on local statistics exist for the purposes of noise reduction, sharpening, and contrast adjustment. For example, the median filter is well known in the art. In this filter, typically implemented for noise reduction, each pixel is replaced with the median value of some surrounding neighborhood. This filtering process is generally very successful at removing impulse noise; however, the processed image appears slightly less sharp than the original.

Another example of a non-linear filter based on local statistics is local histogram equalization, referred to as adaptive histogram modification by William Pratt on pages 278–284 of the book *Digital Image Processing, Second Edition*, John Wiley & Sons, 1991. With this filter, the values of pixels are modified by the cumulative histogram of a local window. This technique effectively adjusts the contrast of each region of a digital image, effectively increasing the local contrast in some regions of the image, and decreasing the contrast in other regions. This technique does not intend to increase the apparent sharpness of any given region. Also, this technique does not ensure that the typical artifacts of ringing will not occur.

Thus, there exists a need for an alternative method of manipulating a digital image in order to generate an image signal that appears to be sharper, or more in focus and while minimizing the ringing artifact, as does the unsharp masking technique.

SUMMARY OF THE INVENTION

The present invention is directed to overcoming one or more of the problems set forth above. Briefly summarized, according to one aspect of the present invention, the invention resides in a method for utilizing a predetermined tone scale conversion to enhance a digital image comprised of a plurality of image pixels, in which the method comprises (a) providing image pixels corresponding to a region of the image; (b) identifying a statistical characteristic of the image pixels in the region; (c) normalizing the predetermined tone scale conversion for the statistical characteristic in order to generate a normalized tone scale conversion; and (d) performing the normalized tone scale conversion on a central pixel of the region in order to generate an enhanced output pixel.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of controlling the value of the central pixel in accordance with a statistical characteristic of the region, e.g., driving the value of the central pixel either toward the local maximum or the local minimum of the region, except in the case where the central pixel is substantially midway between the local maximum and the local minimum. Consequently, edge transitions occur over a narrower range of pixels than in the input image, thus generating an image signal that appears to be sharper, or more in focus, than the original image. Moreover, since the output of the tone scale conversion is modified by the statistical characteristic, e.g., bounded by the local maximum and the local minimum of the region, systematic overshoot and undershoot at an edge boundary is diminished and the ringing artifact is not as noticeable.

DETAILED DESCRIPTION OF THE INVENTION

Figure 1:
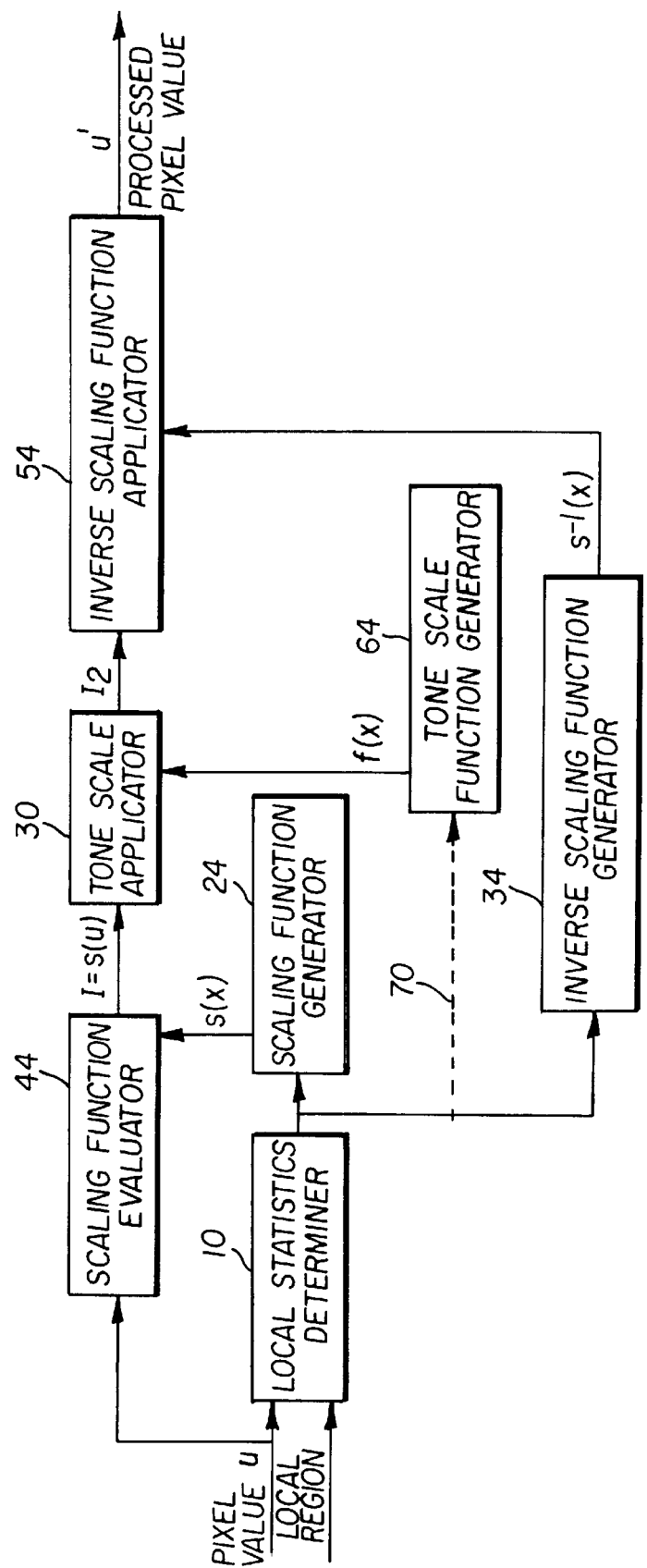
FIG. 1 is a block diagram illustrating an overview of a preferred embodiment of the present invention.

In the following description, the present invention will be described as a method implemented as a software program. Those skilled in the art will readily recognize that the equivalent of such software may also be constructed in hardware. Because image enhancement algorithms and methods are well known, the present description will be directed in particular to algorithm and method steps forming part of, or cooperating more directly with, the method in accordance with the present invention. Other parts of such algorithms and methods, and hardware and/or software for producing and otherwise processing the image signals, not specifically shown or described herein may be selected from such materials, components and elements known in the art. Given the description as set forth in the following specification, all software implementation thereof is conventional and within the ordinary skill in such arts.

The invention involves a sharpening filter algorithm that is adaptive to the morphology of an image, as based on one or more image characteristics calculated over a localized region of the image (as isolated by a two-dimensional window). The filtering algorithm includes software for normalizing the tone scale conversion with a scaling function for the image statistic(s) over the localized region of a digital image and then using the scaled tone scale to reshape the structure of edges in the digital image. More specifically, the shape of the local tone scale function is ordinarily selected before processing the image, but the exact scaling and translation of the local tone scale operation is determined from the statistics in any localized region. Accordingly, after the region is isolated, implementation of the algorithm includes identifying a desired statistical characteristic from the local region, performing a local tone scale conversion that is normalized in relation to the statistical characteristic, and mapping the central pixel of the local region through the tone scale conversion to generate an enhanced central pixel value.

The invention may be practiced in several modes. More specifically, the invention is preferably practiced in a first mode by scaling the input pixel values to the local maximum and minimum for each region and then applying the scaled input values to a tone scale function with normalized coordinates; the output obtained by this conversion operation is then processed with an inverse of the scaling function (used to generate the input) to obtain the enhanced output value. Alternatively, in a second mode of practicing the invention, a local tone scale is constructed having coordinates that are bounded by the local maximum and minimum for each region, and then each central pixel value is mapped through the bounded coordinates of the tone scale function. This will directly produce the enhanced output value. In a third mode, only the input of the tone scale function is scaled with the inverse scaling function and the output pixel is processed with the inverse of the scaling function; in a fourth mode, only the output of the tone scale function is scaled and the input pixel is processed with the scaling fiction. In any mode, the shape of the tone scale function may remain fixed over the image; however, it may be desirable to vary the shape of the tone scale function dependent upon the statistical characteristics of the region. Furthermore, while it may be typical to apply the normalized tone scale operation to substantially all the pixels in the digital image, it may be desirable to only apply the method to selected areas of the image.

Referring to FIG. 1, there is illustrated a block diagram of a preferred embodiment for practicing the present invention according to the first mode as set forth above. It is instructive to note that the present invention utilizes a digital image which is initially captured as a two-dimensional array of red, green, and blue pixel values, or a two-dimensional array of single monochrome pixel values corresponding to light intensities. In this regard, a digital representation of an image, typically in RGB color space consisting of separate red, green, and blue image channels, may be transformed to a luminance-chrominance color space by a color space matrix transformation (not shown) resulting in a luminance image channel and two chrominance image channels, or the digital representation may be directly processed for enhancement as RGB signals. It facilitates understanding to note that the present invention typically operates on either the luminance channel in luminance-chrominance color space or individually on each color channel, for example red, green and blue, in RGB color space. This transformation into a luminance-chrominance color space is well known in the art. After the present invention performs its operations, the digital image is preferably transformed back into RGB color space by an inverse color space matrix transformation (not shown), which permits, e.g., printing a hardcopy of the image or displaying a softcopy of the image on an output device.

It also facilitates understanding to note that the preferred embodiment of the present invention is described in reference to a relatively high resolution digital image channel having, e.g., dimensions of 1024 pixels in height by 1536 pixels in width, although the invention is similarly operative with image channels having greater or lesser image resolutions. The choice of image resolution, however, may have a concomitant effect on the window size, i.e., while a 5×5 window has been found preferable for 1024×1536 resolution, the choice of a higher resolution image sensor would ordinarily allow a larger window size, and vice versa for a lower resolution sensor.

Figure 2:
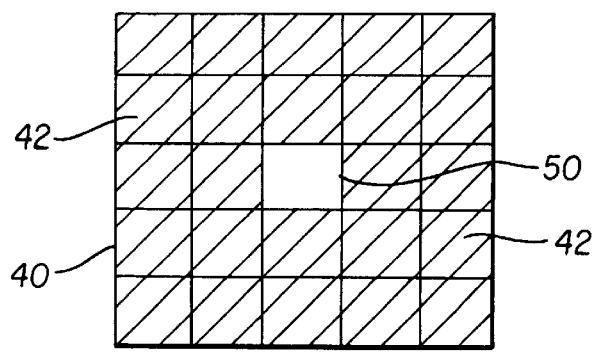
FIG. 2 is an example of a portion of an image showing a central pixel and the associated local region.

With reference also to FIG. 2, the value of each input central pixel 50 of the digital representation of the digital image channel is first passed to a local statistics determiner 10 for calculating local statistics. The values of surrounding pixels 42 included within a local region 40 are also passed to the local statistics determiner 10. The local region 40 and the input pixel 50 constitute a spatial region of the digital image channel. In the preferred embodiment, the local region about each input pixel 50 is defined as a square neighborhood centered on the input pixel for which the local statistics are being determined. In the preferred embodiment, the local region is a square neighborhood with 5 pixels on each side. FIG. 2 illustrates the local region implemented in the preferred embodiment. The pixels 42 included within the local region 40 are illustrated as the 24 pixels (indicated by hatching) surrounding the input pixel 50 passed to the local statistics determiner 10. Those skilled in the art will recognize that the present invention will perform substantially the same operation with a large variety of local region sizes and shapes, and the usage (as claimed) of the term "central" to describe the processed pixel merely refers to a pixel having a local surround of pixels, rather than a pixel at the centroid of its local region.

In FIG. 1, the value of each central pixel 50 is input to the local statistics determiner 10 and a scaling function evaluator 44. In addition, the values of the pixels 42 in the local region are input to the local statistics determiner 10 in order to generate a statistical characteristic of the local region. A scaling function generator 24 uses the statistical characteristic to generate a scaling function s(x) that is applied to the scaling function evaluator 44 in order to normalize the value of each input pixel 50 and thereby generate a first intermediate value I. The statistical characteristic is also used by an inverse scaling function generator 34 to generate a fiction $s^{-1}(x)$ that is the inverse of the scaling function s(x). The first intermediate value I is then applied to a tone scale applicator 30, which maps the intermediate value I through a tone scale function f(x) provided by a tone scale function generator 64 in order to generate second intermediate value $I_2$. The output intermediate value $I_2$ from the tone scale applicator 30 is then applied to an inverse scaling function applicator 54, which generates a processed value u' in the system image space by using the inverse function $s^{-1}(x)$ provided by the inverse scaling function generator 34.

More specifically, the local statistics determiner 10 calculates several characteristics that describe the image data contained in the local region 40 and the input pixel 50. The local statistics could be any mathematical combination of the pixel values contained in the local region 40 and the input pixel 50. In the preferred embodiment, the local statistics determiner 10 determines two local statistics, the maximum and minimum pixel values from the local region 40 and the input pixel 50. As an alternative, the local statistics determiner 10 could determine the mean of the n maximum pixel values, and the mean of the m minimum pixel values, where n and m are integers much smaller than the number of pixels contained in the local region 40, for example, n=m=3. As will be described, these local statistics are utilized in the generation of the scaling function s(x) and the inverse scaling function $s^{-1}(x)$.

Figure 3:
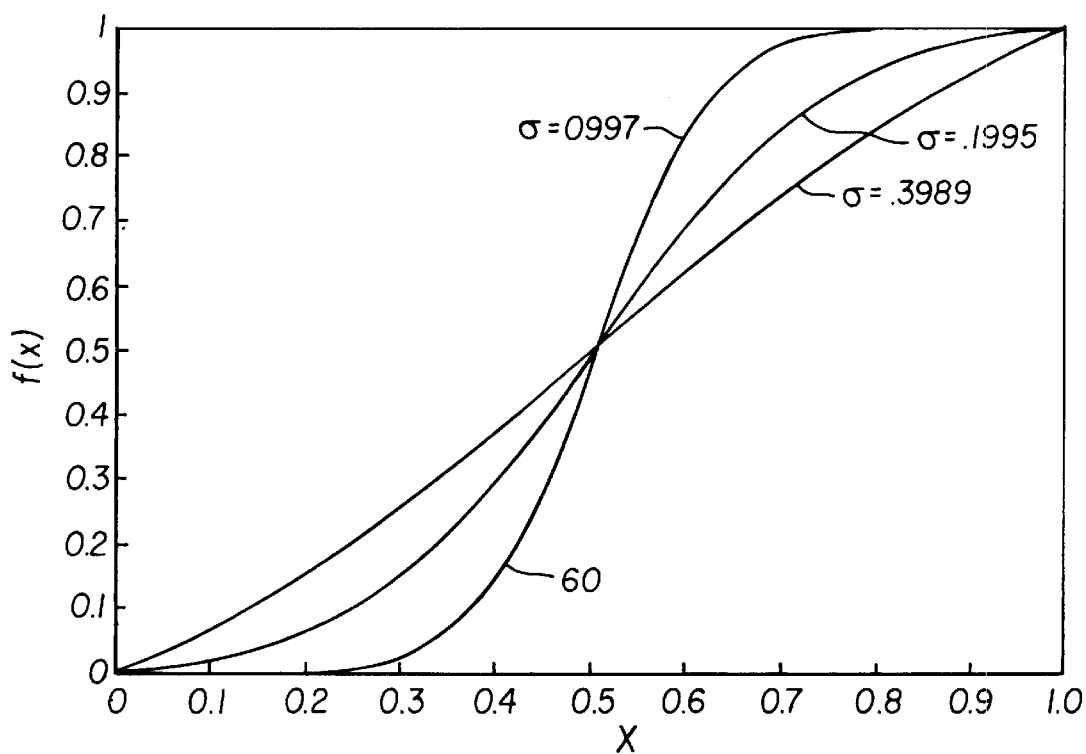
FIG. 3 is an example of several tone scale functions.
Figure 4:
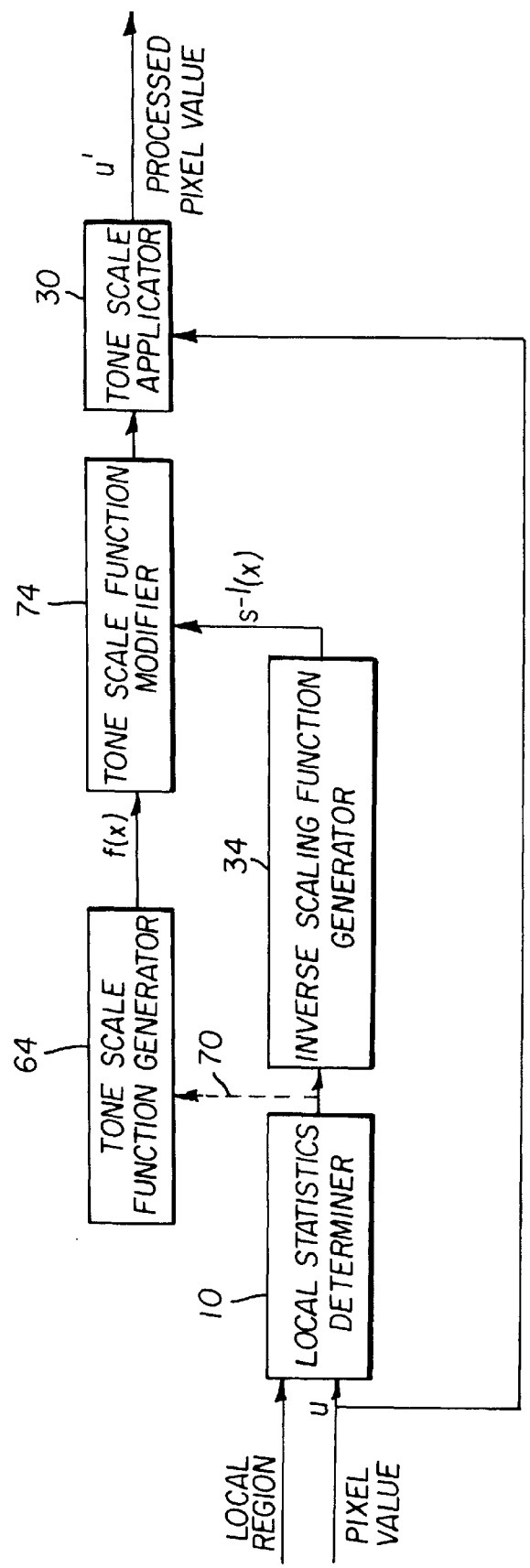
FIG. 4 is a block diagram of a second embodiment of the present invention, wherein the input and output of the tone scale function are scaled.

The local statistics determined by the local statistics determiner 10 are then passed to the scaling function generator 24 and the inverse scaling function generator 34. In the preferred embodiment, the scaling function may be represented with the following equation:

$$s(u) = \frac{u - N}{X - N}$$

where X represents the maximum pixel value from the local region 40 and N represents the minimum pixel value from the local region 40. The purpose of the scaling function is to modify the value of the central pixel 50 such that the modified pixel value may be used as an input to a tone scale function 60, as shown in FIG. 3. In the preferred embodiment, this tone scale function 60 is applied as a look-up-table (LUT). In the preferred embodiment, the effect of the scaling function is to normalize (i.e., compress) the interval [N X] of input values to an interval [0 1], as shown in FIG. 3.

In a similar manner, the inverse scaling function generator 34 creates the inverse scaling function $s^{-1}(u)$; the inverse scaling function $s^{-1}(u)$ may be represented by the following equation:

$$s^{-1}(u) = u(X - N) + N$$

The purpose of the inverse scaling function is to scale the output values obtained from the tone scale function 60 back to the interval [N X]. The scaling function and the inverse scaling function are indeed inverses, as it can easily be shown that $s^{-1}(s(u)) = u$.

The value of the input pixel 50 is then passed to the scaling function evaluator 44 in order to generate an intermediate value I=s(u), where I is the intermediate value, s( ) is the scaling function, and u is the value of the input pixel 50. The output of the scaling function evaluator 44 is the intermediate value I. The intermediate value I is then passed to the tone scale applicator 30. The purpose of the tone scale applicator is to affect the contrast of the value of the input pixel 50 with respect to the local region 40. The tone scale applicator 30 modifies the intermediate value I, thereby creating the second intermediate value $I_2$. The tone scale applicator 30 modifies the intermediate value I with the tone scale function 60 (i.e., f(x)). Thus, the operation of the tone scale applicator may be expressed in the following equation: $I_2 = f(I)$, where $I_2$ is the second intermediate value, f( ) is the tone scale function, and I is the intermediate value output from the scaling function evaluator 44.

The tone scale function f(x) is generated by the tone scale function generator 64. In the preferred embodiment, the tone scale function f(x) is the sigmoid function, formed by integrating a Gaussian probability distribution function, and is well known in the art. The sigmoid function is fully characterized by the standard deviation $\sigma$ of the Gaussian probability function that is integrated. The tone scale function f(x) may be expressed by the following formula:

$$f(x) = \frac{1}{\sigma\sqrt{2\pi}} \int_{-\infty}^{x} \exp\left(\frac{-x^2}{2\sigma^2}\right) dx$$

In the preferred embodiment, the tone scale function is found by computing the summation of discrete samples of a Gaussian distribution, as shown in the following formula:

$$f(x) = \frac{\sum_{u=-a}^{u=a(2x-1)} \exp\frac{-x^2}{2\sigma^2}}{\sum_{u=-a}^{u=a} \exp\frac{-x^2}{2\sigma^2}}$$

where 2a is the number of samples in the LUT. In the preferred embodiment, a=50.

Notice that the slope of the tone scale function f(x) evaluated at x=0.5 may be determined by the relationship:

$$\gamma = \frac{1}{\sigma\sqrt{2\pi}},$$

where $\gamma$ is the slope of the sigmoid function evaluated at x=0.5, and the approximate slope of the summation described above, and $\sigma$ is the standard deviation of the Gaussian probability function. When the value of $\gamma > 1.0$, the operation of the present invention sharpens the digital image channel by reshaping the local structure of edges. When the value of $\gamma$ is <1.0, the operation of the present invention tends to produce an image with a softer appearance than the input image. In the preferred embodiment $\gamma = 2.1$ and $\sigma = 0.19$. In the preferred embodiment, the tone scale function f(x) is independent of the local statistics output from the local statistics determiner 10, and thus need be computed only one time per image channel, despite the number of pixels being processed.

FIG. 3 illustrates a variety of tone scale functions, one of which is shown as the tone scale function 60, and the associated standard deviations of the Gaussian probability function $\sigma$. Those skilled in the art will recognize that a wide variety of functions in addition to the sigmoid function will accomplish the goal of the tone scale applicator 30.

The second intermediate value $I_2$ output from the tone scale applicator 30 is passed to the inverse scaling function applicator 54. In addition, the inverse scaling function $s^{-1}(x)$ output from the inverse scaling function generator 34 is passed to the inverse scaling function applicator 54. The purpose of the inverse scaling function applicator 54 is to generate the processed pixel value u' from the second intermediate value $I_2$. The inverse scaling function applicator 54 generates the enhanced pixel value u' by evaluating the inverse scaling function:

$$u' = s^{-1}(I_2)$$

Substituting for $I_2$ and $I$, $$u' = s^{-1}(f\{s(u)\})$$

where $s^{-1}(x)$ represents the inverse scaling function, $f\{x\}$ represents the tone scale function, $s(x)$ represents the scaling function, u represents the value of the input pixel 50, and u' represents the value of the enhanced pixel.

Typically, the process for generating a processed pixel value u' is repeated for every pixel of the digital image in order to generate a processed pixel value corresponding to each pixel in the digital image. These processed pixel values, when considered as a collection, form a processed digital image channel. Alternatively, the process for generating a processed pixel value u' may repeated for a subset of every pixel of the digital image in order to generate a processed pixel value corresponding to a subset of pixels in the digital image. In the latter case, the subset, when considered as a collection, forms a processed image for a portion of the channel. In general, the parameters of the present algorithm may be adjusted in order to produce an enhanced digital image channel, with the appearance of greater edge contrast and more clarity than the digital image.

Figure 5:
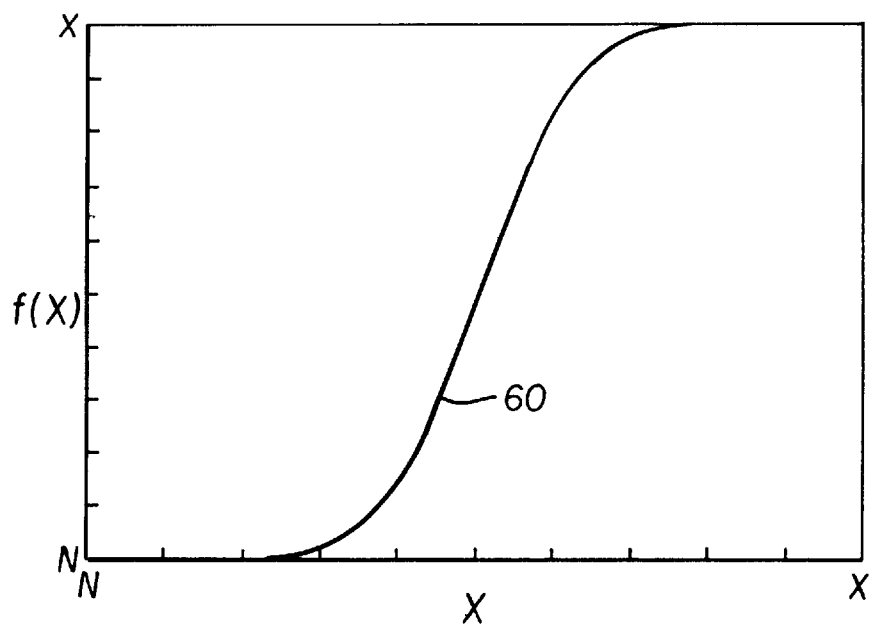
FIG. 5 is an example of a tone scale function modified according to FIG. 4.

FIGS. 4–9 show additional embodiments for practicing the invention in which similar reference characters are used to describe components similar to those shown in the preferred embodiment. In a second embodiment shown in FIG. 4 corresponding to the aforementioned second mode for practicing the invention, the inverse scaling function $s^{-1}(x)$ generated by the inverse scaling function generator 34 is directly applied to modify the tone scale function $f(x)$ in a tone scale function modifier 74, thereby generating a tone scale function $F(x)$ with new input and output coordinates (i.e., mapping the input and output range 0 . . . 1 to a new range min . . . max). An example of such a tone scale is shown in FIG. 5. In this case, the processed pixel value u' is generated in the tone scale applicator 30 by the equation:

$$u' = F(u)$$

Again, the method for generating the processed pixel value would typically be repeated for each pixel in the digital image. This embodiment may be conceptually simpler than the preferred embodiment; however, the computation involved is much greater. The second embodiment herein described produces identical results to the preferred embodiment.

Figure 7:
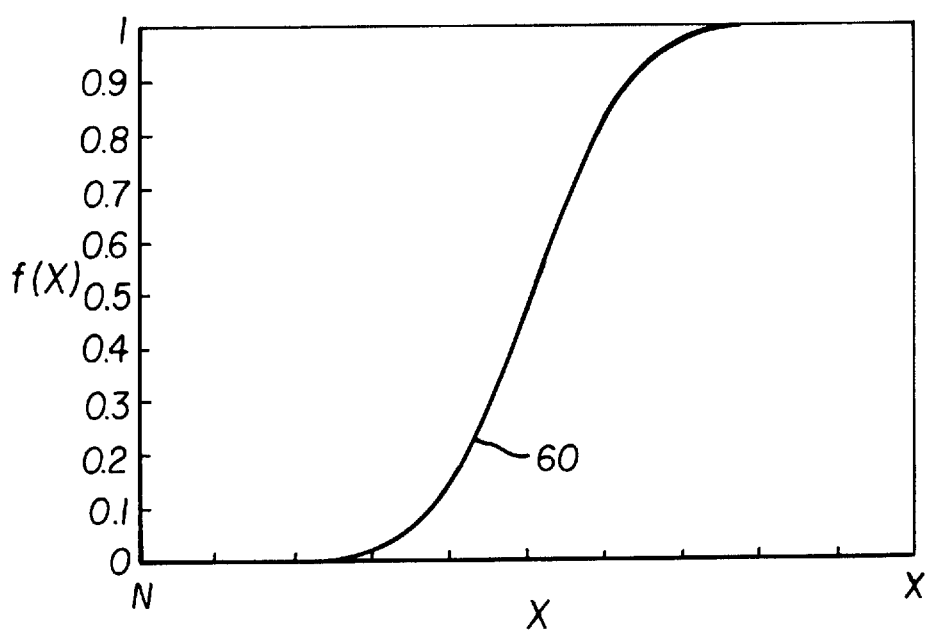
FIG. 7 is an example of a tone scale function modified according to FIG. 6.
Figure 6:
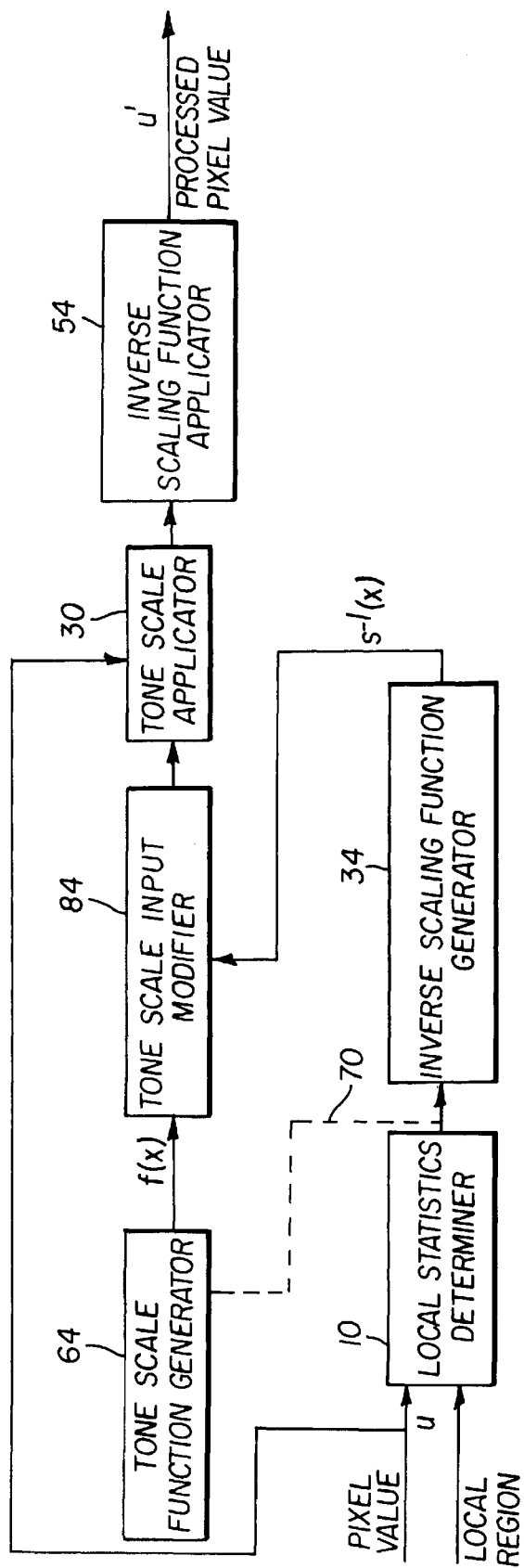
FIG. 6 is a block diagram of a third embodiment of the present invention, wherein only the input of the tone scale function is scaled.
Figure 8:
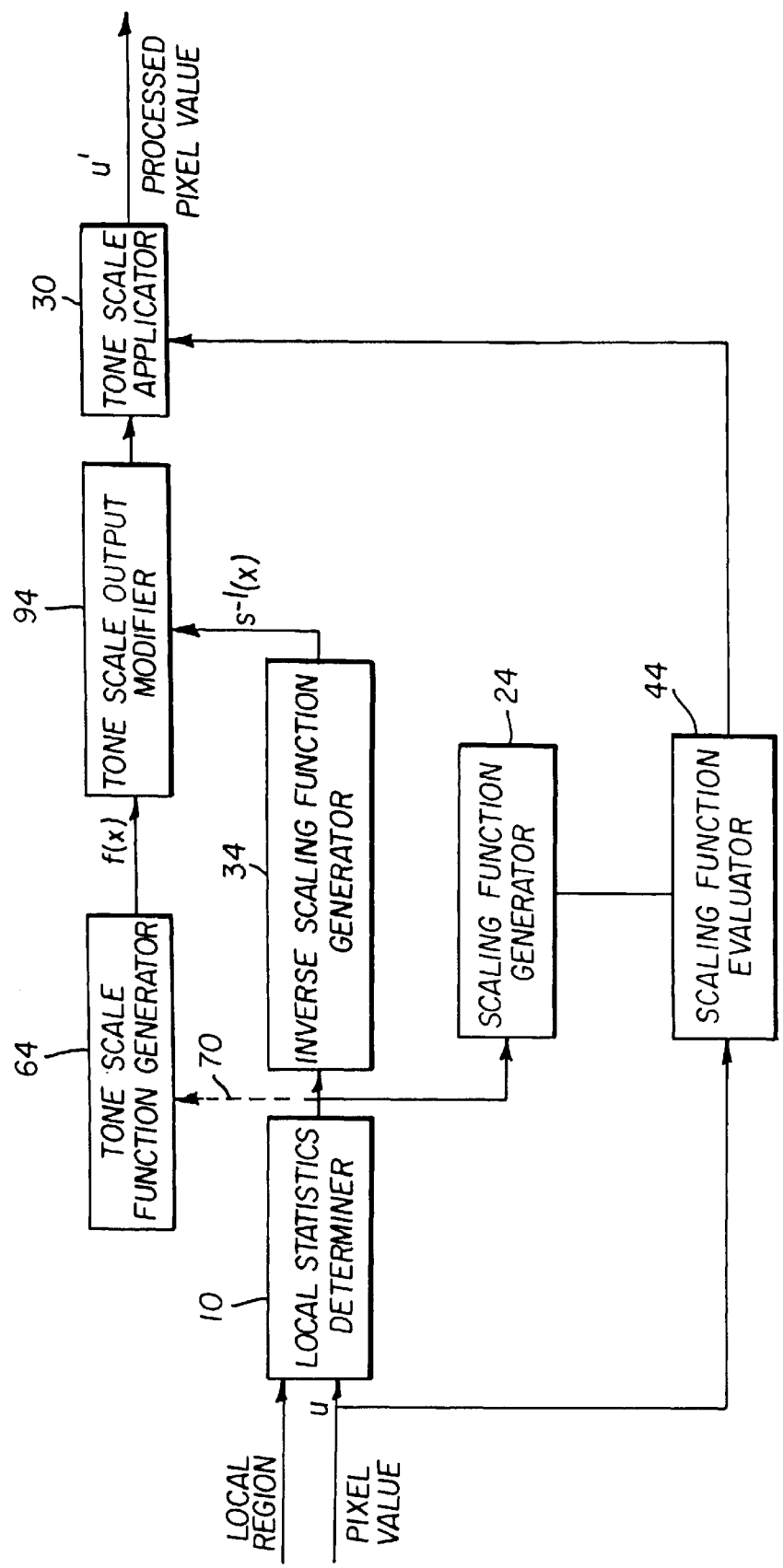
FIG. 8 is a block diagram of a fourth embodiment of the present invention, wherein only the output of the tone scale function is scaled.
Figure 9:
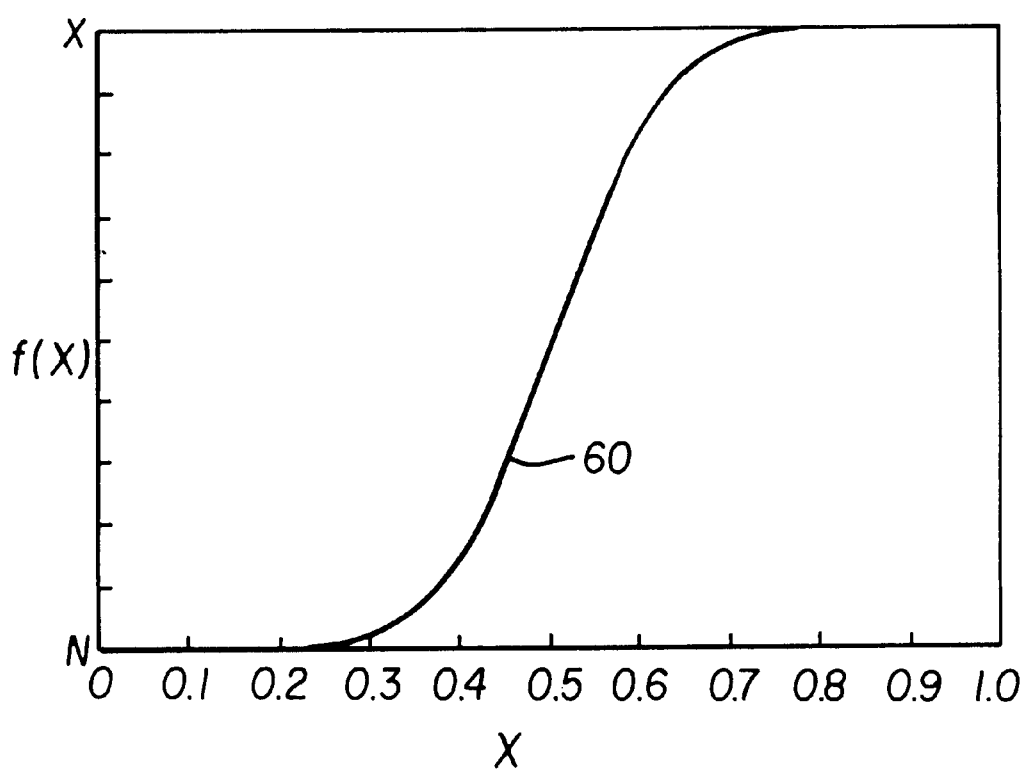
FIG. 9 is an example of a tone scale function modified according to FIG. 8.

In a third embodiment corresponding to the third mode for practicing the invention as shown in FIG. 6, the tone scale function $F(x)$ has only its input scaled by the inverse scaling function generator 34 (to min . . . max) in a tone scale input modifier 84. The output of the tone scale function $f(x)$ must then be converted back to image space by the inverse scaling function generator 54. Alternatively, in a fourth embodiment corresponding to the fourth mode for practicing the invention as shown in FIG. 8, only the output of the tone scale function $f(x)$ is scaled in a tone scale output modifier 94 (to min . . . max). Because only the output coordinate is modified, the input value of the pixel 50 must be scaled by the scaling function evaluator before application to the tone scale applicator 30. The respective tone scales used in the third and fourth embodiments are shown in FIGS. 7 and 9. The third and fourth embodiments herein described produce identical results to the preferred embodiment.

The sharpening algorithm according to the invention requires definition of two parameters: the size of the local region (which may be described by a window size for the sharpening filter) and the shape of the tone scale conversion function (which may be described by the slope of the tone scale function). The algorithm tends to perform best when the window size is kept fairly small, e.g., no greater than say about 7×7 pixels for a 1024×1536 imager. Indeed, as the window size and slope of the local tone scale function increase, the image begins to have a "paint-by-number" artifact. Also, a large window tends to compress texture on either side of a large occlusion boundary type edge in an image because the maximum and the minimum tend to occur on opposite sides of the edge. This effect is reduced by keeping the window size relatively small. A window size of 5×5 or fewer pixels has been found generally preferable for producing satisfactory results in typical situations for a 1024×1536 resolution. As mentioned earlier, other suitable window sizes may be empirically determined without difficulty for other image resolutions; alternatively, a larger window may be acceptable in certain situations for a given resolution if the user is willing to accept increased artifacts in order to obtain the sharpening effect of the larger window.

There is a further trade-off in that noise, e.g., in flat regions such as sky, is also enhanced, and become more noticeable in appearance. Presumably, this occurs because the soft edges of the noise are shaped to appear more square, which increases the visibility of the noise. This problem may be reduced by varying the slope of the local tone scale, depending upon the difference between the maximum and minimum pixel values in any given region. In regions of small difference, the slope of the local tone scale may be nearly 1, producing very little change in the central pixel. In regions with a greater difference between local maximum and local minimum, the slope may be selected to be a value that produces the desired amount of reshaping to the edge. With proper tuning of the parameters, the algorithm can produce images with the appearance of very sharp edges. As a result, the parameters, i.e., window size and slope, need to be empirically determined with these trade-offs, i.e., between artifacts and image sharpening, in mind in order to maximize apparent sharpness of image detail while minimizing the aforementioned deleterious effects.

For example, in an alternative embodiment that, e.g., accounts for noise in flat regions in the image, the slope of the local tone scale may be adjusted so as to depend upon the difference between the maximum and minimum pixel values in any given region. Referring to the broken line 70 in FIGS. 1, 4, 6 and 8 connecting the output of the local statistics determiner 10 with the tone scale function generator 64, note that the tone scale generator 64 may in these embodiments utilize the output of the local statistics determiner 10 in generating the tone scale function $f(x)$. The characteristic shape of the local tone scale curve shape $f(x)$ may be modified by the local statistics determined by the local statistics determiner 10. For example, in an effort to modify regions of the image containing large edges more than noisy image regions, the γ of the g(u) function may be forced to be greater in regions containing large edges than noise image regions. The γ of the curve shape $f(x)$ may be determined by the following relationship:

$$\gamma = (X - N)/100 + 1$$

and σ may then be determined with the relationship:

$$\sigma = \frac{1}{\gamma \sqrt{2\pi}}$$

After the particular C is chosen for the local tone scale curve shape $f(x)$, the local tone scale function is generated in the manner previously described.

The invention has been described in detail with particular reference to preferred embodiments thereof, but it will be understood that variations and modifications can be effected within the spirit and scope of the invention.

What is claimed is:

1. A method for utilizing a predetermined tone scale conversion to enhance a digital image comprised of a plurality of image pixels, each image pixel characterized by an image value, said method comprising the steps of:
   (a) providing image pixels corresponding to a region of the image:
   (b) identifying a statistical characteristic of the image pixels in the region, wherein the statistical characteristic is a gradient value;
   (c) normalizing the predetermined tone scale conversion for the statistical characteristic in order to generate a normalized tone scale conversion; and
   (d) performing the normalized tone scale conversion on a central pixel of the region in order to generate an enhanced output pixel.

2. The method of claim 1 in which the region of step (a) comprises a two dimensional region distributed around the central pixel.

3. The method of claim 2 in which the region of step (a) comprises a 5×5 or smaller array of image pixels.

4. The method of claim 1 in which the gradient value is derived from a maximum and a minimum value for the region.

5. The method of claim 4 in which the gradient value is computed from the difference between maximum and minimum image values of image pixels within the region.

6. The method of claim 1 in which the gradient value is computed from the difference between average maximum and minimum values across respective pluralities of image pixels comprising portions of the region.

7. The method of claim 1 in which the tone scale conversion includes the application of a predetermined tone scale function, step (c) comprises normalizing the value of the central image pixel input to the tone scale function with a scaling function based on the statistical characteristic, and step (d) comprises mapping the scaled value of the central pixel through the tone scale function to generate an intermediate output value.

8. The method of claim 7 in which step (d) further comprises processing the intermediate value of the central image pixel output from the tone scale function with a function that is the inverse of the scaling function.

9. The method of claim 1 in which the tone scale conversion includes application of a predetermined tone scale function and step (c) comprises normalizing the coordinates of the tone scale function based on the statistical characteristic.

10. The method of claim 1 in which the tone scale conversion includes application of a predetermined tone scale function, and the method further comprises the step of adjusting a parameter of the tone scale function based on the statistical characteristic of the region.

11. The method of claim 10 in which the step of adjusting a parameter of the tone scale function comprises varying the slope of the tone scale function.

12. The method of claim 1 in which the steps (a)–(d) are repeated for consecutive overlapping regions such that contiguous central pixels are processed through the tone scale conversion.

13. The method of claim 12 wherein the tone scale conversion includes application of a predetermined tone scale function to all central image pixels processed through the normalized tone scale conversion.

14. The method of claim 1 in which the tone scale conversion includes the application of a predetermined tone scale function having input and output coordinates, step (c) comprises normalizing the input coordinate of the tone scale function with a scaling function based on the statistical characteristic and normalizing the value of the central pixel output from the tone scale function based on the inverse of the scaling function, and then step (d) comprises mapping the value of the central pixel through the tone scale function to generate a scaled output pixel.

15. The method of claim 1 in which the tone scale conversion includes the application of a predetermined tone scale function having input and output coordinates, step (c) comprises normalizing the value of the central pixel input to the tone scale function with a scaling function based on the statistical characteristic and normalizing the output coordinate of the tone scale function based on the inverse of the scaling function, and then step (d) comprises mapping the scaled value of the central pixel through the tone scale function to generate a processed output pixel.

16. A method for enhancing a digital image processed through a digital image channel, the method comprising the steps of:
   a) receiving a pixel value from a spatial region of the digital image;
   b) receiving a tone scale function;
   c) calculating a statistical parameter based on the values of other pixels in the spatial region of the digital image;
   d) generating a scaling function based upon the statistical parameter;
   e) generating a first intermediate value from the pixel value and the scaling function;
   f) generating a second intermediate value from the first intermediate value and the tone scale function; and
   g) generating an enhanced pixel value from an inverse of the scaling function, and the second intermediate value.

17. The method of claim 16 further comprising the step of repeating steps (a) and (c)–(g) in order to generate an enhanced pixel for each pixel in the digital image channel.

18. The method of claim 16 wherein the statistical parameter of step (c) is the maximum or minimum of the pixel values from the spatial region of the digital image channel.

19. The method of claim 18 wherein the statistical parameter is used to normalize the tone scale function creating a normalized tone scale function.

20. The method of claim 18 wherein the statistical parameter is used to normalize the original pixel value creating a normalized pixel value.

21. The method of claim 20 wherein the normalized pixel value is modified by the normalized tone scale function.

22. The method of claim 16 wherein the tone scale function is a predetermined sigmoid function.

23. The method of claim 17 wherein the tone scale function is a predetermined sigmoid function used for each pixel in the digital image.

24. The method of claim 19 wherein the tone scale function is a predetermined sigmoid function that is normalized to create a normalized sigmoid function.

25. The method of claim 24 wherein the normalized pixel value is modified by the normalized sigmoid function.

26. The method of claim 24 wherein the step of using a sigmoid function is further comprised of determining the standard deviation of the sigmoid function based upon the statistical parameters.

* * * * *